United States Patent [19]

Koch

[11] Patent Number: 5,988,608

[45] Date of Patent: Nov. 23, 1999

[54] PISTON-CYLINDER UNIT HAVING A SEALING VALVE

[75] Inventor: Klaus Koch, Dahlheim, Germany

[73] Assignee: Stabilus GmbH, Germany

[21] Appl. No.: 09/026,443

[22] Filed: Feb. 19, 1998

[30] Foreign Application Priority Data

Feb. 20, 1997 [DE] Germany ............... 197 06 919

[51] Int. Cl.$^6$ ..................................... F16F 9/02
[52] U.S. Cl. ............... 267/120; 188/300; 188/322.18
[58] Field of Search .............................. 267/64.12, 120; 188/300, 322.16–322.18

[56] References Cited

U.S. PATENT DOCUMENTS

| 4,156,523 | 5/1979 | Bauer | 267/120 |
|---|---|---|---|
| 4,433,759 | 2/1984 | Ichinose | 267/120 |
| 4,595,182 | 6/1986 | Freitag et al. | 267/120 |
| 5,560,456 | 10/1996 | Koch et al. | 188/300 |
| 5,702,091 | 12/1997 | Perrin et al. | 188/300 |
| 5,797,593 | 8/1998 | Oyaizu | 188/322.17 |

FOREIGN PATENT DOCUMENTS

| 2653552C2 | 6/1978 | Germany . |
|---|---|---|
| 3301266A1 | 7/1984 | Germany . |
| 3301544A1 | 7/1984 | Germany . |
| 4431626A1 | 5/1995 | Germany . |

Primary Examiner—Chris Schwartz
Attorney, Agent, or Firm—Baker & Botts, L.L.P.

[57] ABSTRACT

A piston-cylinder unit includes a piston which divides the cylinder into two working chambers, a sealing valve seals a flow path between the two working chambers in the stationary operating condition of the unit. The sealing valve has a valve element consisting of an axially movable radially sealing sealing ring in conjunction with a valve ring, which at its back is supported by a spring-biased member. The slide member and the valve ring form therebetween a flow-off chamber having a flow-off opening that is sized so that unrestricted fluid flow is permitted so as to prevent the formation of a ram pressure in the flow-off chamber. The sealing ring is movable between three axial positions relative to the valve ring. At a center position, the sealing ring seals the flow path against fluid flow. At the two other positions, the sealing ring permits fluid flow in opposite directions.

5 Claims, 4 Drawing Sheets

PISTON-CYLINDER UNIT HAVING A SEALING VALVE

BACKGROUND OF THE INVENTION

1. Field of the Invention

The present invention relates to a fluid piston-cylinder unit in which a piston, movably carried by a piston rod, divides a cylinder into two working chambers, and a sealing valve closes a fluid flow path across the piston when the piston rod is stationary.

2. The Prior Art

DE 3,301,544 A1 discloses a piston-cylinder unit comprising a piston, which is carried for axial movement by a piston rod, and a cylinder divided into two working chambers by the piston. A sealing valve seals off a fluid flow connection between the two working chambers when the piston rod is in a stationary operating condition. The sealing valve includes a valve element consisting of an axially movable sealing ring in the form of a packing washer in conjunction with a valve seat. The problem in this piston-cylinder unit is that very precise finishing is required to achieve tightness of the sealing valve. A spring, which prestresses the packing washer on the valve seat, is arranged at the back of the washer. The spring is designed with a ground end coil. As a result, under some circumstances the force of the spring on the valve washer is not uniform, so that the washer may become slightly distorted. The resulting fluid leakage is to be avoided. Structural difficulties ensue from the fact that, on the one hand, a considerable annular clearance (see reference numeral 13) and, in addition, a valve opening (reference numeral 18) must be provided for satisfactory operation. The small radial space available limits the possible cross sectional area of the fluid connection between the working chambers.

DE 4,431,626 A1 discloses a piston-cylinder unit having a sealing valve wherein unlike large pressure-impacted surfaces, in conjunction with a ram pressure, hold the sealing valve in an open position. The logic of this valve design lies in that the sealing valve remains in the open position with the application of as small a force as possible. Once the sealing valve is opened, a pressurized piston-cylinder unit with gas prestress will continue to travel out until the unit is brought to a standstill by hand and a pressure equalization that releases the ram pressure is produced. The basic idea of this sealing valve is quite different from that of DE 3,301,544.

DE 3,301,266 A1 describes a gas spring with hydraulic or pneumatic attenuation as a slide-in safety device in the event of loss of pressure. The gas spring has a piston arranged on a piston rod, the piston on the side opposite the piston rod being provided with a piston bore. The piston bore contains a spring chamber, in which a helical spring or a pressurizing gas is arranged. The spring or gas biases a valve pin towards sealing engagement with a valve seat. In normal operation, the operating pressure of the gas spring is higher than the spring force of the helical spring so that the sealing valve is normally open. If the operating pressure in the gas spring drops, the helical spring seals the valve opening and thus prevents sudden retraction of the piston rod.

DE 2,653,552 C2 concerns a gas spring which is designed as a lifting aid for opening and holding tailgates and trunk lids of motor vehicles. The gas spring includes a cylinder filled with pressurized gas, a piston rod arranged displaceable coaxially in the cylinder and extending in a sealed manner out of one end of the cylinder. The piston rod carries a guide piston which sealingly engages the inner wall of the cylinder and which includes a pressure-dependent valve for holding the piston stationary against a specified push-in force exceeding the weight of the tailgate or of the trunk lid. The guide piston has at least one fluid flow channel for connecting the two working chambers. When the specified push-in force is exceeded, the valve opens to permit fluid flow through the channel, thereby permitting inward travel of the piston rod.

SUMMARY OF THE INVENTION

The object of the present invention is to develop a piston-cylinder unit having a sealing valve with the lowest possible fluid leakage.

In accordance with the invention, this object is attained by the provision of a sealing valve for controlling fluid flow through the piston of a piston-cylinder unit, which sealing valve includes an axially movable sealing ring whose radially outer surface sealingly engages the internal wall of the cylinder, an annular valve ring whose radially outer surface is adapted to sealingly engage the radially inner surface of the sealing ring, an axially movable annular slide member, and a sealing spring biasing the slide member towards the valve ring. The slide member and the valve ring form therebetween, as part of a fluid flow path through the piston, a fluid flow-off chamber having a fluid flow-off opening of a size to permit substantially unrestricted fluid flow therethrough and to prevent the formation of a ram pressure therein. The sealing ring is movable between three axial switching positions relative to the valve ring: (1) a central switching position in which the sealing ring sealingly engages the valve ring and seals the flow path against fluid flow between the working chambers of the cylinder, (2) a pressure-dependent switching position axially displaced from the central switching position towards the slide member, to which the sealing ring is displaced by increased fluid pressure resulting from axial movement of the piston rod in the direction of the biasing force of said sealing spring and at which the sealing ring is out of sealing engagement with the valve ring to open the fluid flow path, and (3) a travel-dependent switching position axially displaced from the central switching position away from the slide member, to which the sealing ring is displaced by frictional engagement of the sealing ring with the internal cylinder wall upon axial movement of the piston rod in the direction opposite to the direction of the biasing force of the sealing spring and at which the sealing ring is out of sealing engagement with the valve ring to open the fluid flow path.

The slide guides the sealing ring such that it moves uniformly without distortion from one switching position to another. The flow-off opening advantageously eliminates the buildup of fluid pressure in the flow-off chamber, which otherwise might adversely affect the switching behavior of the sealing ring.

In another advantageous feature, the slide member consists of a guide sleeve and a circular flange, where the flow-off opening is formed in the flange. Especially large flow-off cross sections can be obtained in this region. The fluid flow path through the sealing valve is identical for both directions of flow. Consequently, the cross-sectional area of the flow path may be selected to be as large as desired without space limitations.

In a further advantageous embodiment, the cylinder wall is formed with at least one bypass groove to the sealing valve, so that the piston-cylinder unit, when the sealing ring is within the bypass groove, executes a movement of travel outward (under pressure of the fluid) independently of the switching position of the sealing ring. In the regions of the cylinder in which no bypass groove is present, the speed of travel outward is reduced as a function of the fluid pressure level and the instantaneous load, if necessary, until standstill. In order to increase the extended length of the piston rod, the sealing ring is displaced pressure-dependent in the direction of travel outward into the opening position.

In an alternative embodiment, which preferably is used in the case of especially high holding forces, the sealing valve is displaced pressure-dependent in the direction of travel inward of the piston rod into the opening position.

BRIEF DESCRIPTION OF THE DRAWINGS

The invention will be explained in detail with reference to the following figures of the drawings, wherein.

DESCRIPTION OF A PREFERRED EMBODIMENT

Figures 1A, 1B:
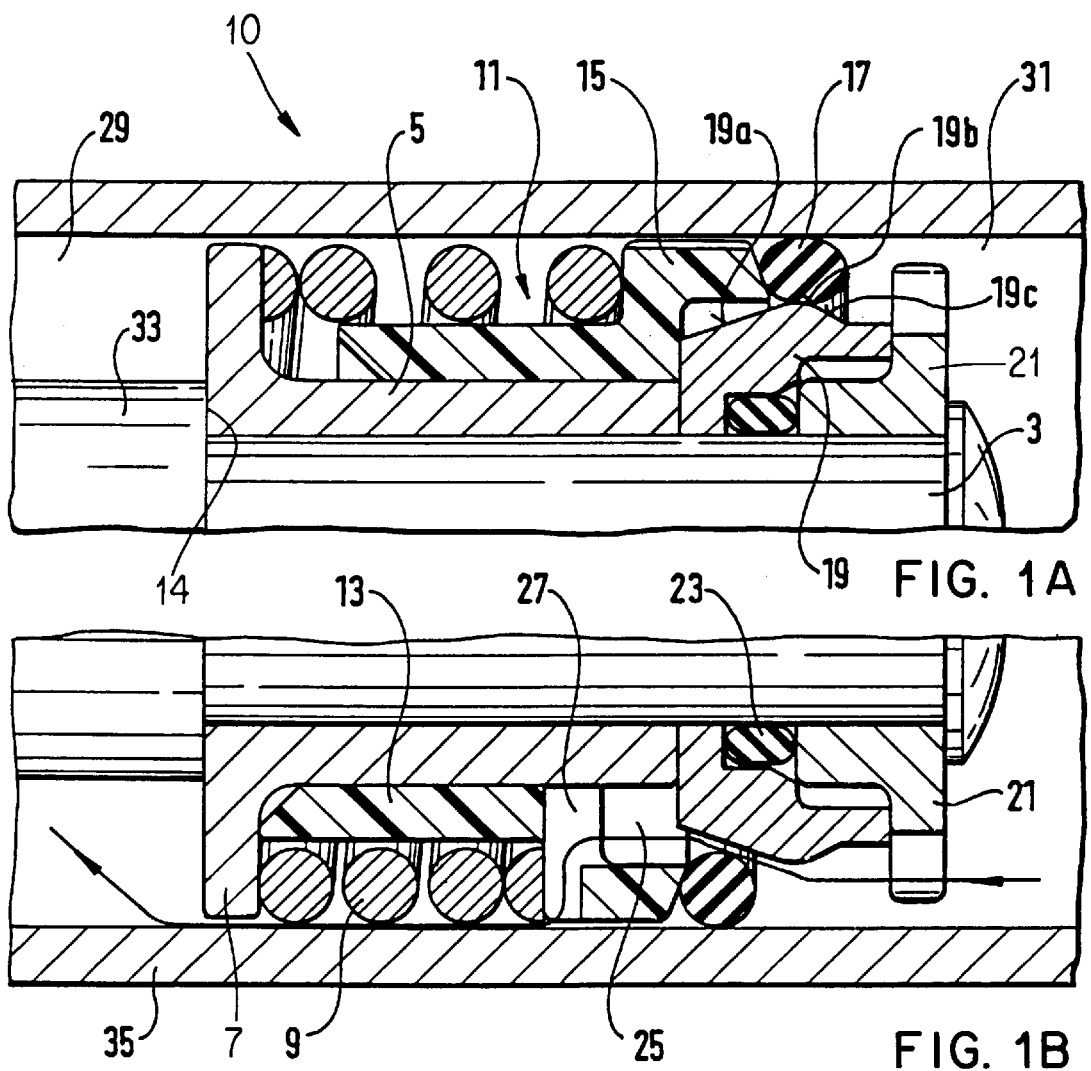
FIG. 1A is a partial sectional view showing the sealing valve, as a structural unit, in the closed position.
FIG. 1B is a partial longitudinal view showing the sealing valve of FIG. 1A in the pressure-dependent open position.

FIGS. 1A and 1B show one embodiment of a sealing valve as a structural unit 10, the views together comprising two switching positions of the sealing valve. In FIG. 1A, which depicts the upper half of the piston-cylinder unit, the valve is closed, while in FIG. 1B, which depicts the lower half, it is open. The sealing valve 10 is carried by a piston-rod pin 3 and includes, inter alia, a stationary guide sleeve 5, which at the end has a continuous flange 7 forming a seat for a compression sealing spring 9. The sealing spring 9 prestresses a slide 11, which is centered by its slide sleeve 13 on the guide sleeve 5. The sealing spring 9 engages a circular slide flange 15, whose axial travel cooperates with an annular sealing ring 17. The sealing ring 17 represents an axially movable valve element which is capable of assuming a variety of switching positions (three are described herein) relative to a valve ring 19. The surface of the valve ring 19 is designed with a contour that permits three switching positions. Considered starting from the left in FIG. 1A, the valve ring 19 has valve seat surfaces in the form of at least one inclined surface 19a, a horizontal holding surface 19b, and another inclined surface 19c. The entire sealing valve 10 is stressed between a stop ring 21 at the end of the piston-rod pin 3 and a shoulder 14 at the juncture of the piston-rod pin 3 and the main body 33 of the piston rod. A valve ring seal 23 prevents leakage between the piston-rod pin 3 and the sealing valve 10.

The valve ring 19 and the slide member 11 form therebetween a flow-off chamber 25. This chamber always has an open flow-off opening 27 to the cylinder working chamber 29, in which the sealing spring 9 is located. In FIG. 1A, the fluid medium cannot penetrate from the working chamber 31, to which the stop ring 21 is adjacent, into the flow-off chamber 25 past the holding surface 19b. This sealed switching position is assumed when the piston rod 33 (with the piston-rod pin 3) is stationary.

Upon movement of the piston rod 33 to the left, a frictional force which is directed against the movement of the piston rod acts between the radially outer surface of the sealing ring 17 and the internal wall of the cylinder 35. The sealing ring 17 is thereby displaced towards the right until it abuts the stop ring 21. The fluid medium, for example, gas, is then capable of flowing from the working chamber 29 to the flow-off chamber 25 and, from there, into the working chamber 31 through the gap formed between the inclined valve seat surface 19c and the sealing ring 17.

If the piston rod 33 is displaced towards the right, the sealing ring 17 abuts the inner end of the slide flange 15 as shown in FIG. 1A. The sealing ring 17 is pressed against the flange 15 by the pressure in the working chamber 31 and by frictional force between the cylinder 35 and the sealing ring 17. If the sum of frictional and pressure forces is greater than the closing force of the sealing spring 9, the slide 11, together with the sealing ring 17, moves into the position shown in FIG. 1B. Fluid flow can then occur from the working chamber 31 to the flow-off chamber 25 via the gap between the sealing ring 17 and the inclined valve seat surface 19a. From there, the flow can escape practically unrestricted through the flow-off opening 27 into the working chamber 29. Because of the sizing of the flow-off opening 27, no ram pressure is built up in the flow-off chamber 25 (in either direction of flow), which would exert an undesired force on the slide 11 or the sealing ring 17. According to the gas flow shown by the arrow in FIG. 1B, a fluid connection then exists between the working chambers 29 and 31.

According to the invention, the same flow path is used in both directions of flow through the sealing valve.

Figure 2:
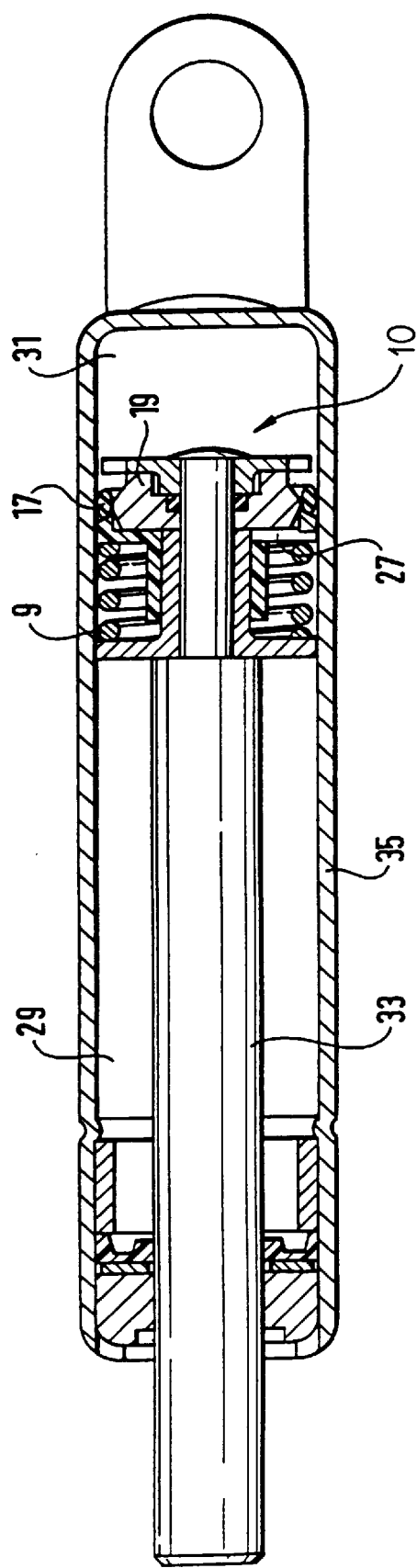
FIG. 2 shows the sealing valve in a piston-cylinder unit with a high push-in force.

FIG. 2 shows an application of the sealing valve 10 according to the invention in a piston-cylinder unit designed as a gas spring. The sealing valve 10 corresponds exactly to that shown in FIGS. 1A and 1B. In considering the mode of operation, it should be noted that the closing or biasing force of the sealing spring 9 is always directed against the force of the gas. The direction of movement has to be considered in the frictional force of the sealing ring 17.

Figure 3:
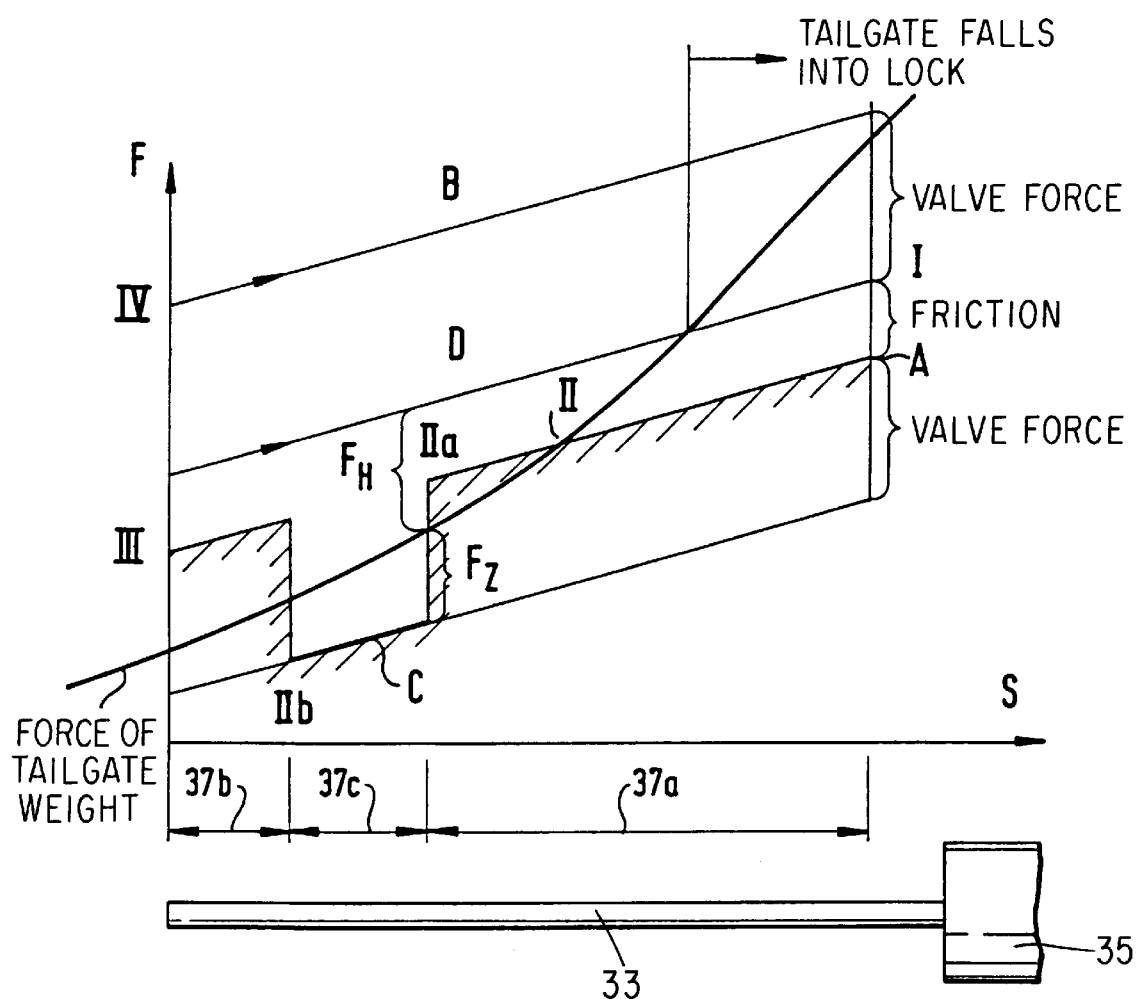
FIG. 3 is a characteristic force-vs-displacement curve diagram.

FIG. 3 shows the spring force characteristic curve in the slide-in and slide-out directions. Under the abscissa, which indicates the stroke of the piston rod 33, the associated position of the piston-cylinder unit can be seen. The force produced by the piston-cylinder unit is shown on the ordinate. By way of example, a progressing curve represents the weight force pattern of a vehicle tailgate. In the direction of outward travel of the piston rod, the sealing effect of the sealing valve 10 is canceled. Starting from the operating point I, at which the piston rod 33 at its innermost position of travel relative to the cylinder 35, the piston rod 33 travels out on the characteristic curve A. The sealing valve 10 is bridged, since the sealing ring 17 rests on the stop ring 21, and, hence, a fluid connection exists between the working chambers 29 and 31, so that the unit functions like a conventional unblockable gas spring. From the point of intersection II with the curve of the weight force of the vehicle tailgate, the piston rod moves independently without additional manual force. At the maximum position of outward travel of the piston rod 33, the operating point III is reached.

In the slide-in direction, the frictional force and the valve force have to be overcome. These two forces together with the pressure force due to the gas pressure in the piston-cylinder unit result in the holding force at the operating point IV.

The stroke-dependent holding force is described by the characteristic curve B. This configuration is advantageously used where great loads must be held securely.

Figure 4:
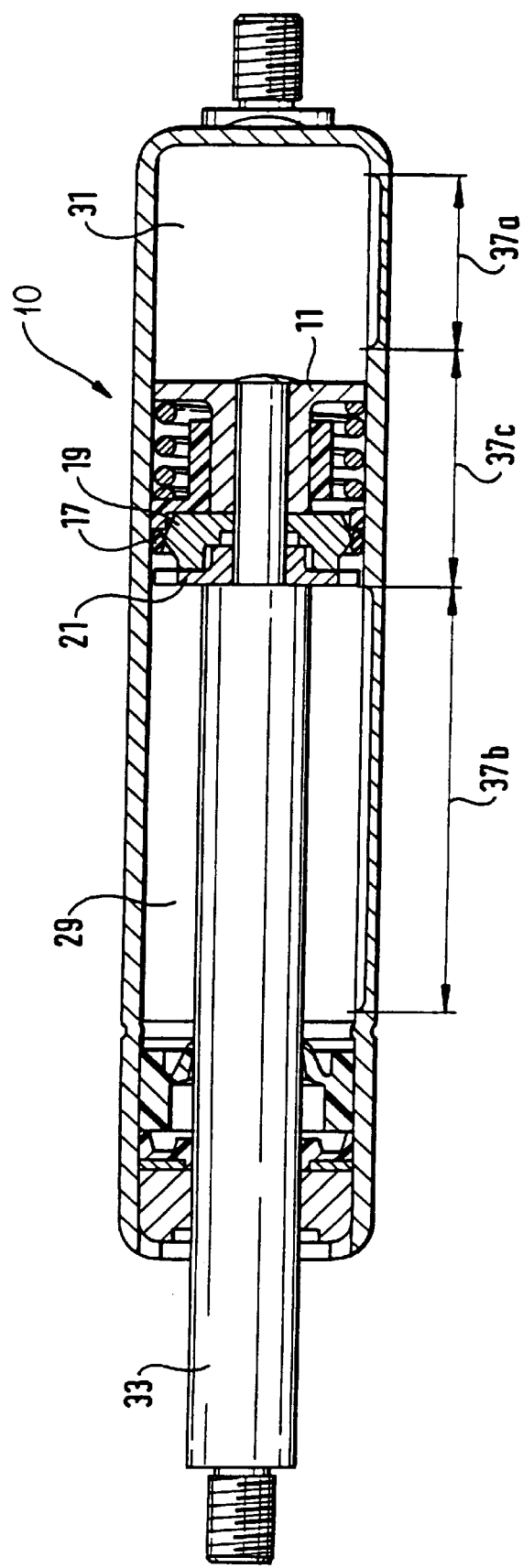
FIG. 4 shows the sealing valve in a piston-cylinder unit with a reduced push-out force.

The piston-cylinder unit according to the design of FIG. 4 works a little differently. The essential reasons for this are that the inner wall of the cylinder 35 has at least one axially-extending groove, but, preferably, has a plurality of grooves 37a and 37b, which are axially separated by at least one groove-free region 37c. In addition, the sealing valve 10 is fastened to the piston rod 33 so that it can be opened or closed in a pressure-dependent manner in the outward direction of travel of the piston rod.

With reference to FIG. 3 and starting again from the operating point I, the tailgate of the vehicle is raised with the use of an additional force which corresponds quantitatively to the difference between force values F referred to the instantaneous abscissa value. Starting from the operating point II, the piston-cylinder unit raises the tailgate independently. At the end of the groove 37a, the piston rod remains at the operating point IIa, since the sealing valve 10 is effective. The holding force $F_H$ is indicated in FIG. 3. The groove-free region is deliberately intended to prevent the movement of travel outward, since an additional manual force $F_Z$ (indicated in FIG. 3) must be applied in order to open the sealing valve 10 so as to allow a further outward movement of travel, controlled by the user, to be executed. As soon as the end of the groove-free region 37c, at the operating point IIb on the characteristic curve C, is reached, the piston-cylinder unit travels out farther to the operating point III. The holding force of the piston-cylinder unit is shown along the characteristic curve D, also between operating points IIa and IIb. In the inward direction of travel, the sealing force of the sealing valve 10 is not effective during the entire stroke, since the sealing ring 17 then rests against the stop ring 21.

I claim:

1. In a piston-cylinder unit comprising a cylinder, a piston rod extending into the cylinder and being axially movable relative thereto, a piston carried by the piston rod within the cylinder and dividing the cylinder into two working chambers, a pressurized fluid in said working chambers, and a sealing valve carried by the piston for selectively sealing a fluid flow path across the piston between the two working chambers; the improvement in said sealing valve comprising:

an axially movable sealing ring, the radially outer surface of which sealingly engages the internal wall of the cylinder;

an annular valve ring, the radially outer surface of which is adapted to sealingly engage the radially inner surface of the sealing ring;

an axially movable annular slide member;

a sealing spring biasing said slide member towards said valve ring, said slide member and said valve ring forming therebetween, as part of said fluid flow path, a fluid flow-off chamber having a fluid flow-off opening of a size to permit substantially unrestricted fluid flow therethrough and to prevent the formation of a ram pressure therein;

said sealing ring being movable between three axial switching positions relative to said valve ring, (1) a central switching position in which said sealing ring sealingly engages said valve ring and seals said flow path against fluid flow between said working chambers, (2) a pressure-dependent switching position axially displaced from said central switching position towards said slide member, to which said sealing ring is displaced by increased fluid pressure resulting from axial movement of said piston rod in the direction of the biasing force of said sealing spring and at which said sealing ring is out of sealing engagement with said valve ring to open said fluid flow path, and (3) a travel-dependent switching position axially displaced from said central switching position away from said slide member, to which said sealing ring is displaced by frictional engagement of said sealing ring with the internal cylinder wall upon axial movement of said piston rod in the direction opposite to the direction of the biasing force of said sealing spring and at which said sealing ring is out of sealing engagement with said valve ring to open said fluid flow path.

2. A piston-cylinder unit according to claim 1, wherein said slide member comprises:

a guide sleeve; and a circular flange portion extending radially from said guide sleeve at the axial end thereof adjacent said valve ring, said fluid flow-off opening being located in said flange portion.

3. A piston-cylinder unit according to claim 1, wherein the improvement further comprises at least one axially-extending fluid bypass groove in the internal wall of the cylinder, said piston rod being movable axially outward of said cylinder under the pressure of said pressurized fluid, when said sealing ring is located within the axial length of said bypass groove, independently of the switching position of said sealing ring.

4. A piston-cylinder unit according to claim 1, wherein said sealing ring is axially displaced to said pressure-dependent switching position upon axially outward movement of said piston rod relative to said cylinder.

5. A piston-cylinder unit according to claim 1, wherein said sealing ring is axially displaced to said pressure-dependent switching position upon axially inward movement of said piston rod relative to said cylinder.

* * * * *